United States Patent
Yavor

(10) Patent No.: US 6,760,137 B1
(45) Date of Patent: Jul. 6, 2004

(54) WAVE DIVISION MULTIPLEXING COMMUNICATIONS SYSTEM

(75) Inventor: Gabriel Yavor, Givatayim (IL)

(73) Assignee: ECI Telecom, Ltd., Petach Tikva (IL)

( * ) Notice: Subject to any disclaimer, the term of this patent is extended or adjusted under 35 U.S.C. 154(b) by 0 days.

(21) Appl. No.: 09/268,132

(22) Filed: Mar. 12, 1999

(30) Foreign Application Priority Data

Feb. 16, 1999 (IL) .............................................. 128557

(51) Int. Cl.[7] .............................................. H04J 14/02
(52) U.S. Cl. ........................ 359/133; 359/124; 385/24
(58) Field of Search ................................ 359/124, 133, 359/180, 189; 385/24

(56) References Cited

U.S. PATENT DOCUMENTS

| | | | |
|---|---|---|---|
| 5,355,237 A | 10/1994 | Lang et al. ............... 359/130 |
| 5,455,672 A | 10/1995 | Lamonde et al. .......... 356/73.1 |
| 5,463,487 A | 10/1995 | Epworth .................... 359/124 |
| 5,559,910 A * | 9/1996 | Taga et al. .................. 385/24 |
| 5,589,969 A * | 12/1996 | Taga et al. ................. 359/124 |
| 5,600,473 A | 2/1997 | Huber ....................... 359/179 |
| 6,295,149 B1 * | 9/2001 | Meli .......................... 359/130 |

* cited by examiner

Primary Examiner—Kinfe-Michael Negash
(74) Attorney, Agent, or Firm—Nath & Associates; Harold L. Novick

(57) ABSTRACT

This invention discloses a wave division multiplexing communications system including a pluarity of optical transmitters, each of said optical transmitters further including a distributed feed back laser characterized in that it has a dispersion penalty of less than 2 dB when used for transmission into an optical fiber having chromatic dispersion of 1800 ps/nm, a driver operative for receiving a communications signal input and providing electrical power to said distributed feed back laser in accordance therewith and a wave division multiplexer receiving outputs from said plurality of optical transmitters comprising thin film dielectric layers and having a maximum power insertion loss of 4.5 dB.

18 Claims, 3 Drawing Sheets

WAVE DIVISION MULTIPLEXING COMMUNICATIONS SYSTEM

FIELD OF THE INVENTION

The present invention relates to wave division multiplexing communications systems, devices and methods generally.

BACKGROUND OF THE INVENTION

Wave division multiplexing communication systems employing optical fiber links are known in the art but suffer in some cases from a limitation in range and/or in transmission rate and thus require amplification along the optical fiber links for distances generally exceeding 80 km.

The following patents and publications are believed to represent the state of the art and are hereby incorporated by reference: U.S. Pat. Nos. 5,600,473; 5,455,672; 5,463,487; 5,355,237.

SUMMARY OF THE INVENTION

The present invention seeks to overcome the above-described limitations of prior art wave division multiplexing communications systems.

There is thus provided in accordance with a preferred embodiment of the present invention a wave division multiplexing communications system a wave division multiplexing communications system including a plurality of optical transmitters, each of the optical transmitters including a distributed feed back laser characterized in that it has a dispersion penalty of less than 2 dB when used for transmission into an optical fiber having chromatic dispersion of 1800 ps/nm, driver operative for receiving a communications signal input and providing electrical power to the distributed feed back laser in accordance therewith, and a wave division multiplexer receiving outputs from the plurality of optical transmitters including thin film dielectric layers and having a maximum power insertion loss of 4.5 dB.

There is also provided in accordance with another preferred embodiment of the present invention a wave division demultiplexing communications system including a wave division demultiplexer receiving wave division multiplexed inputs and including thin film dielectric layers and having a maximum power insertion loss of 4.5 dB, the wave division demultiplexer being characterized in that losses exceeding 25 dB for adjacent channels and exceeding 35 dB for non-adjacent channels are experienced, and a plurality of optical receivers receiving demultiplexed inputs, each of the optical receivers including an avalanche photodiode trans-impedance amplifier having a sensitivity of at least −25 dBm, a limiting amplifier which receives an output from the avalanche photodiode trans-impedance amplifier, and a clock and data recovery circuit receiving an output signal from the limiting amplifier.

Further in accordance with a preferred embodiment of the present invention the transmission power of each of the optical transmitters exceeds +2 dBm.

Further in accordance with a preferred embodiment of the present invention the avalanche photodiode trans-impedance amplifier has a sensitivity of at least −29 dBm.

There is thus provided in accordance with another preferred embodiment of the present invention a wave division multiplexing communications system including a plurality of optical transmitters, each of the optical transmitters including a distributed feed back laser characterized in that it has a dispersion penalty of less than 2 dB when used for transmission into an optical fiber having chromatic dispersion of 1800 ps/nm, a driver operative for receiving a communications signal input and providing electrical power to the distributed feed back laser in accordance therewith, and a wave division multiplexer receiving outputs from the plurality of optical transmitters and including thin film dielectric layers and having a maximum power insertion loss of 4.5 dB, a plurality of optical receivers, each of the optical receivers including an avalanche photodiode trans-impedance amplifier having a sensitivity of at least −25 dBm, a limiting amplifier which receives an output from the avalanche photodiode trans-impedance amplifier, and a clock and data recovery circuit receiving an output signal from the limiting amplifier and a wave division demultiplexer receiving an input from the wave division multiplexer and providing outputs to the optical receivers and including thin film dielectric layers and having a maximum power insertion loss of 4.5 dB, the wave division demultiplexer being characterized in that losses exceeding 25 dB for adjacent channels and exceeding 35 dB for non-adjacent channels are experienced, wherein the maximum combined power insertion losses of the wave division multiplexer and the wave division demultiplexer do not exceed 7.0 dB, thereby obviating the need for power amplification equipment between the wave division multiplexer and the wave division demultiplexer.

These is also provided in accordance with yet another preferred embodiment of the present invention a wave division multiplexing communications system including a plurality of optical transmitters, a wave division multiplexer receiving outputs from the plurality of optical transmitters and having a maximum power insertion loss of 4.5 dB, an optical fiber link having a distance exceeding 80 km, a plurality of optical receivers, and a wave division demultiplexer receiving an input from the wave division multiplexer over the optical fiber link and providing outputs to the optical receivers and having a maximum power insertion loss of 4.5 dB, wherein the maximum combined power insertion losses of the wave division multiplexer and the wave division demultiplexer do not exceed 7.0 dB, thereby obviating the need for power amplification equipment between the wave division multiplexer and the wave division demultiplexer.

There is also provided in accordance with another preferred embodiment of the present invention a wave division multiplexing communications system including a plurality of optical transmitters, a wave division multiplexer receiving outputs from the plurality of optical transmitters and having a maximum power insertion loss of 4.5 dB, an optical fiber link, a plurality of optical receivers, and a wave division demultiplexer receiving an input from the wave division multiplexer over the optical fiber link and providing outputs to the optical receivers and having a maximum power insertion loss of 4.5 dB, wherein the optical fiber link line loss is less than about 22 dB and the maximum combined power insertion losses of the wave division multiplexer and the wave division demultiplexer do not exceed 7.0 dB, thereby obviating the need for power amplification equipment between the wave division multiplexer and the wave division demultiplexer.

Further in accordance with a preferred embodiment of the present invention each of the plurality of optical transmitters includes a distributed feed back laser characterized in that it has a dispersion penalty of less than 2 dB when used for transmission into an optical fiber having chromatic dispersion of 1800 ps/nm, a driver operative for receiving a communications signal input and providing electrical power to the distributed feed back laser in accordance therewith.

Still further in accordance with a preferred embodiment of the present invention the transmission power of each of the optical transmitters exceeds +2 dBm.

Additionally in accordance with a preferred embodiment of the present invention the wave division multiplexing communications system includes eight optical transmitters.

Moreover in accordance with a preferred embodiment of the present invention each of the plurality of optical receivers includes a plurality of optical receivers receiving demultiplexed inputs, each of the optical receivers further including an avalanche photodiode trans-impedance amplifier having a sensitivity of at least −25 dBm, a limiting amplifier which receives an output from the avalanche photodiode trans-impedance amplifier, and a clock and data recovery circuit receiving an output signal from the limiting amplifier.

Preferably the division demultiplexer includes thin film dielectric layers and has a maximum power insertion loss of 4.5 dB, the wave division demultiplexer being characterized in that losses exceeding 25 dB for adjacent channels and exceeding 35 dB for non-adjacent channels are experienced.

There is thus provided in accordance with a preferred embodiment of the present invention a wave division multiplexing communications system including a plurality of optical transmitters, a wave division multiplexer receiving outputs from the plurality of optical transmitters and having a maximum power insertion loss of 4.5 dB, an optical fiber link, a plurality of optical receivers, and a wave division demultiplexer receiving an input from the wave division multiplexer over the optical fiber link and providing outputs to the optical receivers and having a maximum power insertion loss of 4.5 dB, wherein the optical fiber link line loss is less than about 22 dB and the maximum combined power insertion losses of the wave division multiplexer and the wave division demultiplexer do not exceed 10.0 dB, thereby obviating the need for power amplification equipment between the wave division multiplexer and the wave division demultiplexer.

Further in accordance with a preferred embodiment of the present invention each of the plurality of optical transmitters includes a distributed feed back laser characterized in that it has a dispersion penalty of less than 2 dB when used for transmission into an optical fiber having chromatic dispersion of 1800 ps/nm, a driver operative for receiving a communications signal input and providing electrical power to the distributed feed back laser in accordance therewith.

Still further in accordance with a preferred embodiment of the present invention the transmission power of each of the optical transmitters exceeds +5 dBm and preferably including sixteen optical transmitters.

Additionally in accordance with a preferred embodiment of the present invention each of the plurality of optical receivers includes a plurality of optical receivers receiving demultiplexed inputs, each of the optical receivers includes an avalanche photodiode trans-impedance amplifier having a sensitivity of at least −25 dBm, a limiting amplifier which receives an output from the avalanche photodiode trans-impedance amplifier, and a clock and data recovery circuit receiving an output signal from the limiting amplifier.

Moreover in accordance with a preferred embodiment of the present invention the division demultiplexer includes thin film dielectric layers and has a maximum power insertion loss of 4.5 dB, the wave division demultiplexer being characterized in that losses exceeding 2.5 dB for adjacent channels and exceeding 35 dB for non-adjacent channels are experienced.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
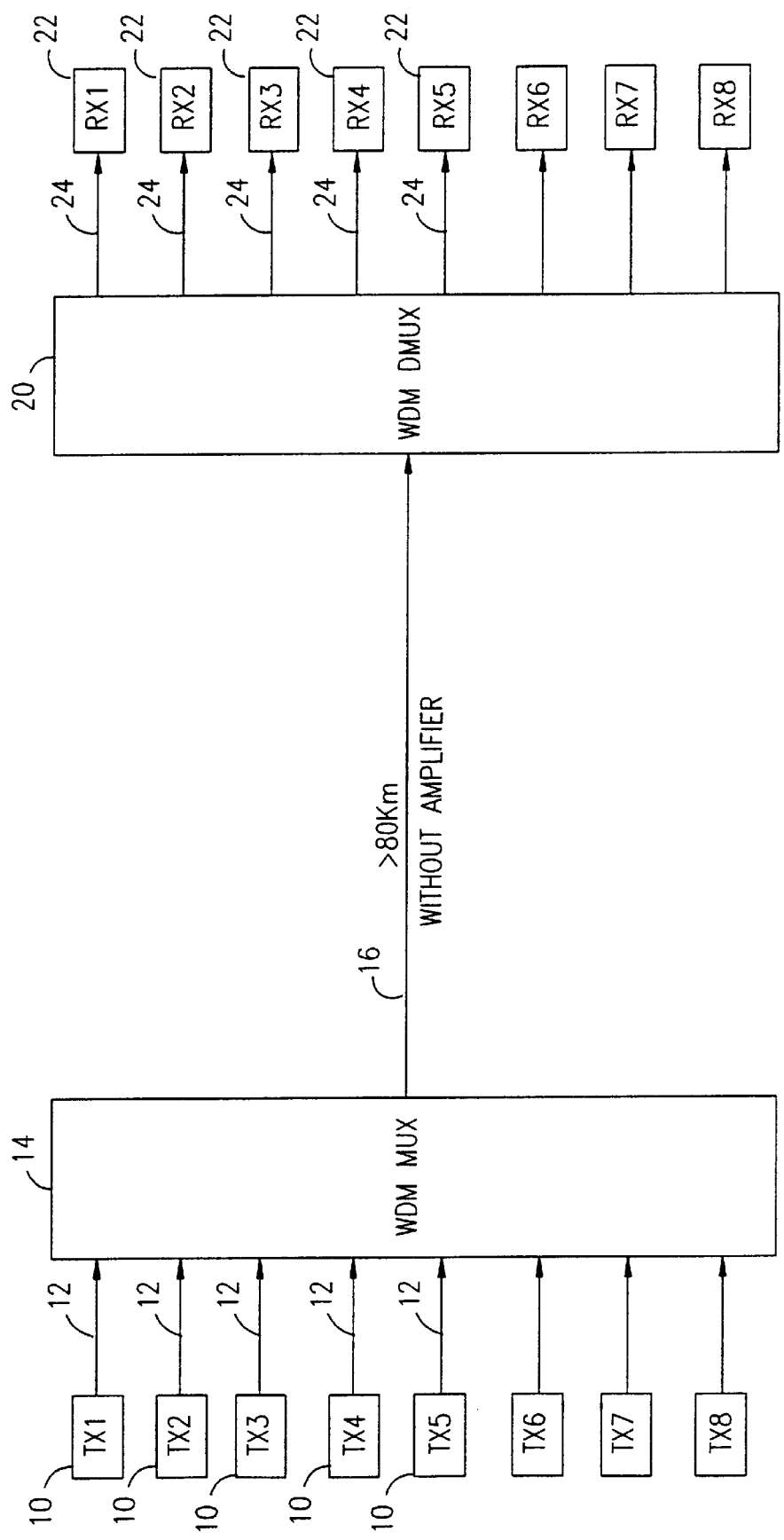
FIG. 1 is a simplified block diagram illustration of a wave division multiplexing communications system constructed and operative in accordance with a preferred embodiment of the present invention.

Reference is now made to FIG. 1, which illustrates a preferred embodiment of a wave division multiplexing communications system constructed and operative in accordance with a preferred embodiment of the present invention.

The wave division multiplexing communications system of FIG. 1 preferably comprises a plurality of optical transmitters 10, typically at least eight in number, at least one of which and preferably all of which having transmission power which exceeds +2 dBm. If sixteen optical transmitters are employed, the transmission power of at least one and preferably all of them preferably exceeds +5 dBm.

The outputs of each optical transmitter 10 are coupled via an optical fiber 12 to a wave division multiplexer 14. The multiplexer 14 multiplexes the outputs of the plurality of optical transmitters 10 and outputs a multiplexed signal via an optical fiber link 16 to a wave division demultiplexer 20, typically at a location remote from that of multiplexer 14. The demultiplexer 20 demultiplexes signals received over optical fiber link 16 and supplies the demultiplexed signals to a plurality of optical receivers 22 via optical fibers 24.

It is a particular feature of the present invention that, in contrast to the prior art, the optical fiber link 16 exceeds about 80 km and does not include or require amplification there along between the multiplexer 14 and the demultiplexer 20.

It is another particular feature of the system of the present invention that, in contrast to the prior art, the optical fiber link line loss can be up to 22 dB.

It is appreciated that the system of the present invention is not limited to a half-duplex system as shown in FIG. 1, but is normally embodied in full-duplex system, comprising a pair of half-duplex systems of the type described herein and shown in FIG. 1.

In accordance with a preferred embodiment of the present invention the maximum power insertion loss of both multiplexer 14 and demultiplexer 20 should not exceed about 7 dB. Where sixteen channels are provided rather than the eight channels in the illustrated example, the maximum power insertion loss of both multiplexer 14 and demultiplexer 20 may exceed 7 dB but should not exceed about 10 dB.

Figure 2:
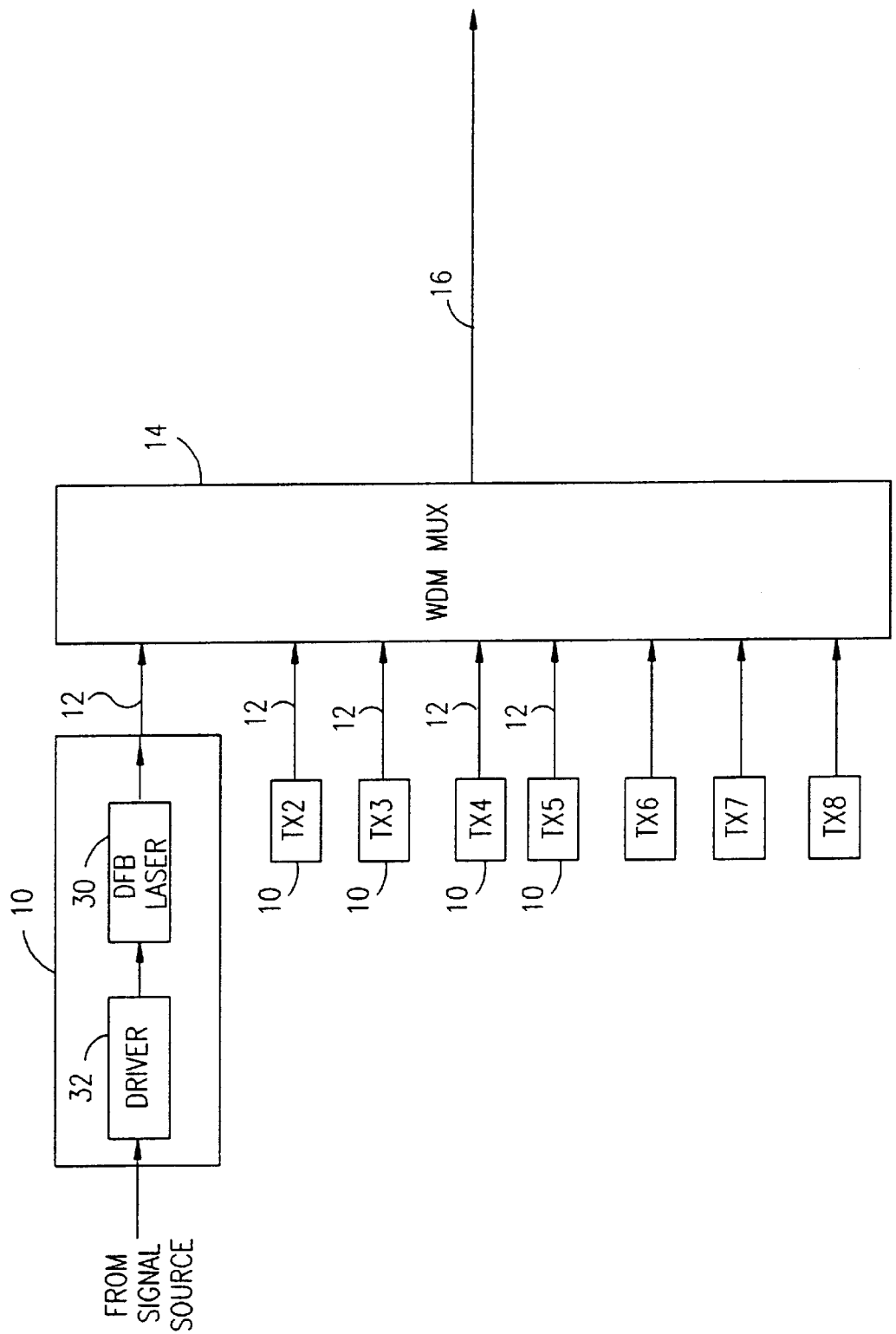
FIG. 2 is a simplified block diagram illustration of part of a transmit end of the system of FIG. 1.

Reference is now made to FIG. 2, which illustrates part of a preferred embodiment of a transmit end of the system of FIG. 1. It is seen that the transmit end of the system preferably comprises a plurality of optical transmitters 12, typically 8 in number, each of which preferably includes a distributed feedback (DFB) laser 30 characterized in that it has a dispersion penalty of less than 2 dB when used for transmission into an optical fiber having a chromatic dispersion of 1800 ps/nm. It is appreciated that the chromatic dispersion of 1800 ps/nm may take place over fiber lengths between about 100 km to hundreds of kilometers, depending on the type of fiber.

In accordance with a preferred embodiment of the present invention, the laser 30 is driven by a driver 32 operative for receiving a communications signal input from a signal source (not shown) and providing electrical power to the distributed feedback laser 30 in accordance the amplitude of the communications signal input thereto.

Further in accordance with a preferred embodiment of the present invention multiplexer 14 comprises thin film dielectric layers and preferably has a maximum power insertion loss of 4.5 dB.

It is appreciated that if sixteen optical transmitters are employed, rather than eight as in the illustrated example, the maximum power insertion loss may be 6.5 dB.

Figure 3:
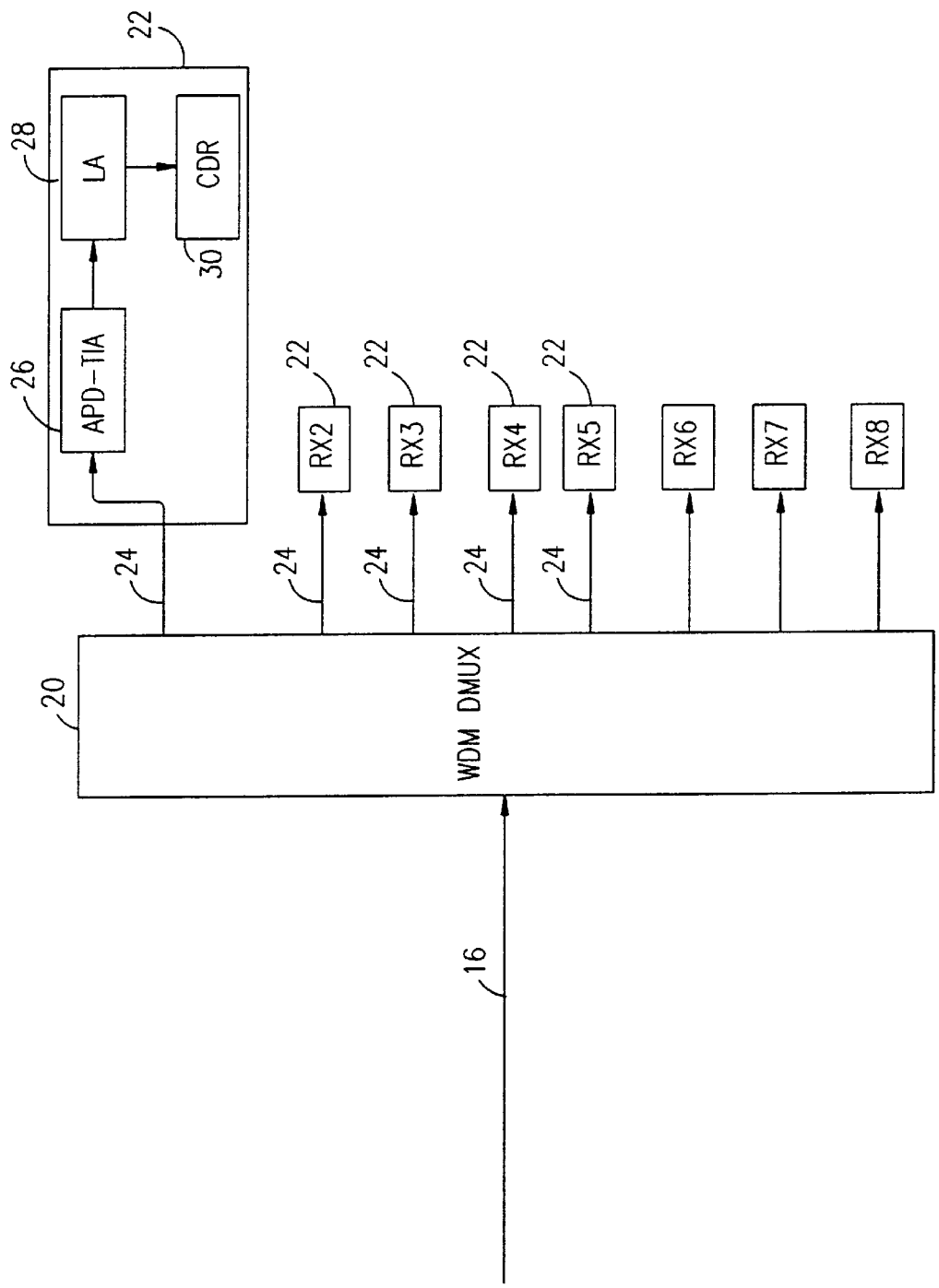
FIG. 3 is a simplified block diagram illustration of part of a receive end of the system of FIG. 1.

Reference is now made to FIG. 3, which illustrates part of a preferred embodiment of a receive end of the system of FIG. 1. It is seen that the receive end preferably comprises wave division demultiplexer 20 receiving wave-multiplexed inputs over the optical fiber link 16 and providing a demultiplexed output to optical receivers 22 over optical fibers 24, the demultiplexer being characterized in preferably having a maximum power insertion loss of 4.5 dB, and in that losses exceeding 25 dB for adjacent channels and exceeding 35 dB for non-adjacent channels are preferably experienced.

The optical receivers 22, which receive the demultiplexed outputs of wave division demultiplexer 20 are preferably each characterized in that they comprise an avalanche photodiode, trans-impedance amplifier (APD-TIA) 26, preferably having a sensitivity of at least −25 dBm, a limiting amplifier (LA) 28, which receives an output from the avalanche photodiode, trans-impedance amplifier 26 and a clock and data recovery circuit (CDR) 30 receiving an output signal from the limiting amplifier 28.

It will be appreciated by persons skilled in the art that the present invention is not limited to what has been particularly shown and described hereinabove. Rather the scope of the present invention includes both combinations and subcombinations of various features described hereinabove as well as modifications and additions thereto which would occur to a person skilled in the art upon reading the foregoing description and which are not in the prior art.

What is claimed is:

1. A wave division multiplexing communications system comprising:
   a plurality of optical transmitters, each of said optical transmitters comprising:
      a distributed feed back laser characterized in that it has a dispersion penalty of less than 2 dB when used for transmission into an optical fiber having chromatic dispersion of 1800 ps/nm;
      a driver operative for receiving a communications signal input and providing electrical power to said distributed feed back laser in accordance therewith; and
      a wave division multiplexer receiving outputs from said plurality of optical transmitters comprising thin film dielectric layers and having a maximum power insertion loss of 4.5 dB.

2. A wave division demultiplexing communications system comprising:
   a wave division demultiplexer receiving wave division multiplexed inputs and comprising thin film dielectric layers and having a maximum power insertion loss of 4.5 dB, said wave division demultiplexer being characterized in that losses exceeding 25 dB for adjacent channels and exceeding 35 dB for non-adjacent channels are experienced; and
   a plurality of optical receivers receiving demultiplexed inputs, each of said optical receivers comprising:
      an avalanche photodiode trans-impedance amplifier having a sensitivity of at least −25 dBm;
      a limiting amplifier which receives an output from said avalanche photodiode trans-impedance amplifier; and
      a clock and data recovery circuit receiving an output signal from said limiting amplifier.

3. A wave division multiplexing communications system according to claim 1, wherein the transmission power of at least one of said optical transmitters exceeds +2 dBm.

4. A wave division demultiplexing communications system according to claim 2 and wherein said avalanche photodiode trans-impedance amplifier has a sensitivity of at least −29 dBm.

5. A wave division multiplexing communications system comprising:
   a plurality of optical transmitters, each of said optical transmitters comprising:
      a distributed feed back laser characterized in that it has a dispersion penalty of less than 2 dB when used for transmission into an optical fiber having chromatic dispersion of 1800 ps/nm;
      a driver operative for receiving a communications signal input and providing electrical power to said distributed feed back laser in accordance therewith; and
   a wave division multiplexer receiving outputs from said plurality of optical transmitters and comprising thin film dielectric layers and having a maximum power insertion loss of 4.5 dB;
   a plurality of optical receivers, each of said optical receivers comprising:
      an avalanche photodiode trans-impedance amplifier having a sensitivity of at least −25 dBm;
      a limiting amplifier which receives an output from said avalanche photodiode trans-impedance amplifier; and
      a clock and data recovery circuit receiving an output signal from said limiting amplifier; and
   a wave division demultiplexer receiving an input from said wave division multiplexer and providing outputs to said optical receivers and comprising thin film dielectric layers and having a maximum power insertion loss of 4.5 dB, said wave division demultiplexer being characterized in that losses exceeding 25 dB for adjacent channels and exceeding 35 dB for non-adjacent channels are experienced,
   wherein the maximum combined power insertion losses of said wave division multiplexer and said wave division demultiplexer do not exceed 7.0 dB, thereby obviating the need for power amplification equipment between said wave division multiplexer and said wave division demultiplexer.

6. A wave division multiplexing communications system comprising:
   a plurality of optical transmitters;
   a wave division multiplexer receiving outputs from said plurality of optical transmitters and having a maximum power insertion loss of 4.5 dB;
   an optical fiber link having a distance exceeding 80 km;

a plurality of optical receivers; and a wave division demultiplexer receiving an input from said wave division multiplexer over said optical fiber link and providing outputs to said optical receivers and having a maximum power insertion loss of 4.5 dB;

wherein the maximum combined power insertion losses of said wave division multiplexer and said wave division demultiplexer do not exceed 7.0 dB, thereby obviating the need for power amplification equipment between said wave division multiplexer and said wave division demultiplexer.

7. A wave division multiplexing communications system comprising:

a plurality of optical transmitters;

a wave division multiplexer receiving outputs from said plurality of optical transmitters and having a maximum power insertion loss of 4.5 dB;

an optical fiber link;

a plurality of optical receivers; and a wave division demultiplexer receiving an input from said wave division multiplexer over said optical fiber link and providing outputs to said optical receivers and having a maximum power insertion loss of 4.5 dB;

wherein the optical fiber link line loss is less than about 22 dB and the maximum combined power insertion losses of said wave division multiplexer and said wave division demultiplexer do not exceed 7.0 dB, thereby obviating the need for power amplification equipment between said wave division multiplexer and said wave division demultiplexer.

8. A wave division multiplexing communications system according to claim 7 and wherein each of said plurality of optical transmitters comprises:

a distributed feed back laser characterized in that it has a dispersion penalty of less than 2 dB when used for transmission into an optical fiber having chromatic dispersion of 1800 ps/nm;

a driver operative for receiving a communications signal input and providing electrical power to said distributed feed back laser in accordance therewith.

9. A wave division multiplexing communications system according to claim 8 and wherein the transmission power of each of said optical transmitters exceeds +2 dBm.

10. A wave division multiplexing communications system according to claim 9, comprising eight optical transmitters.

11. A wave division multiplexing communications system according to claim 7 and wherein each of said plurality of optical receivers comprises:

a plurality of optical receivers receiving demultiplexed inputs, each of said optical receivers comprising:

an avalanche photodiode trans-impedance amplifier having a sensitivity of at least −25 dBm, a limiting amplifier which receives an output from said avalanche photodiode trans-impedance amplifier; and a clock and data recovery circuit receiving an output signal from said limiting amplifier.

12. A wave division multiplexing communications system according to claim 7 and wherein said division demultiplexer comprises thin film dielectric layers and has a maximum power insertion loss of 4.5 dB, said wave division demultiplexer being characterized in that losses exceeding 25 dB for adjacent channels and exceeding 35 dB for non-adjacent channels are experienced.

13. A wave division multiplexing communications system comprising:

a plurality of optical transmitters;

a wave division multiplexer receiving outputs from said plurality of optical transmitters and having a maximum power insertion loss of 6.5 dB;

an optical fiber link;

a plurality of optical receivers; and a wave division demultiplexer receiving an input from said wave division multiplexer over said optical fiber link and providing outputs to said optical receivers and having a maximum power insertion loss of 6.5 dB;

wherein the optical fiber link line loss is less than about 22 dB and the maximum combined power insertion losses of said wave division multiplexer and said wave division demultiplexer do not exceed 10.0 dB, thereby obviating the need for power amplification equipment between said wave division multiplexer and said wave division demultiplexer.

14. A wave division multiplexing communications system according to claim 13 and wherein each of said plurality of optical transmitters comprises:

a distributed feed back laser characterized in that it has a dispersion penalty of less than 2 dB when used for transmission into an optical fiber having chromatic dispersion of 1800 ps/nm;

a driver operative for receiving a communications signal input and providing electrical power to said distributed feed back laser in accordance therewith.

15. A wave division multiplexing communications system according to claim 14 and wherein the transmission power of each of said optical transmitters exceeds +5 dBm.

16. A wave division multiplexing communications system according to claim 15, comprising sixteen optical transmitters.

17. A wave division multiplexing communications system according to claim 13 and wherein each of said plurality of optical receivers comprises:

a plurality of optical receivers receiving demultiplexed inputs, each of said optical receivers comprising:

an avalanche photodiode trans-impedance amplifier having a sensitivity of at least −25 dBm;

a limiting amplifier which receives an output from said avalanche photodiode trans-impedance amplifier; and a clock and data recovery circuit receiving an output signal from said limiting amplifier.

18. A wave division multiplexing communications system according to claim 13 and wherein said division demultiplexer comprises thin film dielectric layers and has a maximum power insertion loss of 6.5 dB, said wave division demultiplexer being characterized in that losses exceeding 25 dB for adjacent channels and exceeding 35 dB for non-adjacent channels are experienced.

* * * * *